(12) United States Patent
Neudorf et al.

(10) Patent No.: US 10,136,582 B2
(45) Date of Patent: Nov. 27, 2018

(54) BALE LOADING TRAILER WITH AUTOMATIC BALE MOVEMENT

(71) Applicant: Highline Manufacturing Limited, Vonda (CA)

(72) Inventors: Blake Neudorf, Vonda (CA); Justin Regier, Vonda (CA)

(73) Assignee: Highline Manufacturing Limited, Vonda (CA)

( * ) Notice: Subject to any disclaimer, the term of this patent is extended or adjusted under 35 U.S.C. 154(b) by 124 days.

(21) Appl. No.: 15/147,360

(22) Filed: May 5, 2016

(65) Prior Publication Data

US 2017/0112064 A1    Apr. 27, 2017

(30) Foreign Application Priority Data

Oct. 27, 2015    (CA) .................................... 2910301

(51) Int. Cl.
*A01D 90/00*    (2006.01)
*A01D 90/08*    (2006.01)
(Continued)

(52) U.S. Cl.
CPC ............ *A01D 90/083* (2013.01); *B60P 1/022* (2013.01); *B62D 63/06* (2013.01)

(58) Field of Classification Search
CPC ....... A01D 90/083; A01D 90/02; B60P 1/022; B60P 1/02; B60P 1/025; B62D 63/06; B62D 63/08
(Continued)

(56) References Cited

U.S. PATENT DOCUMENTS 4,103,794 A * 8/1978 Shaw .................. A01D 90/083
                                                          280/488
4,268,199 A    5/1981 Fontrier
(Continued)

FOREIGN PATENT DOCUMENTS

CA        2300006        9/2001

OTHER PUBLICATIONS

Canadian Office Action Received for Canadian App. No. 2,910,301 dated Jul. 14, 2017, 4 pgs.
(Continued)

*Primary Examiner* — Lynn E Schwenning
(74) *Attorney, Agent, or Firm* — Michael A. Bondi; Moss & Barnett

(57) ABSTRACT

A bale loading trailer has a bale supporting frame mounted on wheels. A fork assembly is pivotally mounted beside a front end of the frame configured to engage a bale when in a lowered position, and to disengage the bale when in a raised position such that the bale moves onto the front end of the bale supporting frame. A hydraulic cylinder moves the fork assembly between positions. A hydraulic motor driven conveyor chain assembly extends along the bale supporting frame, and loaded bales rest on, and move along the frame in concert with, the conveyor chain. A valve circuit connects the hydraulic cylinder and the hydraulic motor drive such that as the fork assembly moves from the raised position to the lowered position, hydraulic fluid flows from the hydraulic cylinder through the hydraulic motor drive and causes the conveyor chain assembly to move a bale length rearward.

21 Claims, 3 Drawing Sheets

(51) Int. Cl.
*B60P 1/02* (2006.01)
*B62D 63/06* (2006.01)

(58) Field of Classification Search
USPC .............. 414/24.5, 24.6, 25, 111, 132, 721;
91/520, 530, 536, 453; 901/7; 60/420,
60/422
See application file for complete search history.

(56) References Cited

U.S. PATENT DOCUMENTS

| | | | |
|---|---|---|---|
| 4,394,103 A * | 7/1983 | Butler ................. | A01D 90/083 414/24.5 |
| 4,630,986 A | 12/1986 | Taylor | |
| 4,710,086 A * | 12/1987 | Naaktgeboren ........ | A01D 90/08 414/111 |
| 4,718,806 A * | 1/1988 | Chambers ............ | A01D 87/127 414/24.5 |
| 4,909,694 A * | 3/1990 | Peters ................. | A01D 90/083 298/10 |
| 5,700,154 A | 12/1997 | Dufraisse | |
| 6,935,827 B2 | 8/2005 | Delaurier | |
| 8,696,290 B2 * | 4/2014 | Shoemaker .......... | A01D 90/083 414/111 |
| 8,967,934 B1 | 3/2015 | Palmlund | |

OTHER PUBLICATIONS

Canadian Office Action Received for Canadian App. No. 2,910,301 dated Jan. 24, 2017, 3 pgs.

* cited by examiner

BALE LOADING TRAILER WITH AUTOMATIC BALE MOVEMENT

FIELD OF THE INVENTION

This disclosure relates to the field of agricultural equipment and in particular a trailer for loading and transporting large cylindrical bales of crop material.

BACKGROUND OF THE INVENTION

Hay, straw and like agricultural products are commonly harvested from the field by cutting same and baling into large cylindrical bales. Various bale moving equipment has been developed to collect these bales and transport same to a storage location.

For example U.S. Pat. No. 8,967,934 to Palmlund et al. discloses a trailer with an elongated bale supporting frame mounted on wheels with a bale lifting assembly mounted on one side. The large cylindrical bales are lifted from the ground by a fork assembly and placed onto the front end of the bale supporting frame. A bale shifting assembly pushes rearward on the front bale to move the row of accumulating bales sequentially rearward as they are loaded until the bale supporting frame is filled. Palmlund also discusses generally the possibility of automating the process of lifting the bale and moving the bale rearward to make room for the next bale.

The trailer of Palmlund carries a single row of bales, while U.S. Pat. No. 6,935,827 to Delaurier discloses a trailer with two side-by-side rows of bales. Delaurier has a fork assembly on each side and a pair of side-by-side bale supporting frames mounted on wheels. The bales rest on a conveyor chain under each row of bales, and each conveyor chain is operated to move the accumulating bales sequentially rearward as they are loaded until the corresponding bale supporting frame is filled.

Similarly Canadian Patent 2,300,006 to Rempel discloses a trailer a pair of side-by-side bale supporting frames mounted. The frames comprise right and left rails, and a conveyor chain running along the top of each rail. The bales rest on the right and left conveyor chains and are moved sequentially rearward by operating the conveyor chains.

SUMMARY OF THE INVENTION

The present disclosure provides a bale loading trailer apparatus that overcomes problems in the prior art.

In a first embodiment the present disclosure provides a bale loading trailer apparatus for loading cylindrical bales. The apparatus comprises a bale supporting frame mounted on wheels, with a hitch at a front end thereof adapted for connection to a towing vehicle. A fork assembly is pivotally mounted beside a front end of the bale supporting frame and is configured to engage a bale resting on a ground surface when in a lowered position, and to disengage the bale when the fork assembly is in a raised position such that the bale moves onto the front end of the bale supporting frame. A hydraulic cylinder is operative to move the fork assembly between the lowered position and the raised position. A conveyor chain assembly extends along substantially a length of the bale supporting frame, and is configured such that loaded bales rest on the conveyor chain assembly, and move along the bale supporting frame in concert with the conveyor chain assembly. A hydraulic motor drive is operative to move the conveyor chain assembly. A hydraulic valve circuit connects the hydraulic cylinder and the hydraulic motor drive such that as the fork assembly moves from the raised position to the lowered position, hydraulic fluid flows from the hydraulic cylinder through the hydraulic motor drive and causes the conveyor chain assembly to move a cycle distance in a rearward direction, and such that as the fork assembly moves from the lowered position to the raised position, the conveyor chain assembly remains substantially stationary.

In a second embodiment the present disclosure provides a method of loading cylindrical bales. The method comprises mounting a bale supporting frame on wheels, and connecting a hitch at a front end thereof to a towing vehicle; pivotally mounting a fork assembly beside a front end of the bale supporting frame and configuring a hydraulic cylinder to move the fork assembly between a lowered position and a raised position; maneuvering the towing vehicle with the fork assembly in the lowered position such that the fork assembly engages a first bale resting on a ground surface; operating the hydraulic cylinder to move the fork assembly to the raised position where the fork assembly disengages the first bale and the first bale moves onto the front end of the bale supporting frame and rests on a conveyor chain assembly extending along substantially a length of the bale supporting frame; wherein the hydraulic cylinder is connected to a hydraulic motor drive operative to move the conveyor chain assembly, the connection configured such that as the fork assembly moves from the raised position to the lowered position, hydraulic fluid flows from the hydraulic cylinder through the hydraulic motor drive, and such that as the fork assembly moves from the lowered position to the raised position, the conveyor chain assembly remains substantially stationary; moving the fork assembly from the raised position to the lowered position such that hydraulic fluid flows from the hydraulic cylinder through the hydraulic motor drive and causes the conveyor chain assembly, and any bales resting thereon, to move a cycle distance in a rearward direction; maneuvering the towing vehicle with the fork assembly in the lowered position to engage the fork assembly with a second bale resting on a ground surface; and operating the hydraulic cylinder to move the fork assembly to the raised position such that the second bale moves onto the front end of the bale supporting frame and rests on the conveyor chain assembly forward of the first bale.

The bale loading trailer apparatus and method of the present disclosure reduces demands on the operator by providing a simple and economical configuration for automatically moving a freshly loaded bale rearwards by rotating the hydraulic motor driving the chain assembly as the fork assembly is lowered after placing a bale on the bale supporting frame. Hydraulic fluid flowing from the hydraulic cylinder that operates the fork assembly is directed through the hydraulic motor or motors as the fork assembly is lowered to a position ready to pick up the next bale. The amount of hydraulic fluid flowing through the hydraulic motor or motors is selected to move the bale rearward the desired distance corresponding to the length of the bale.

Thus the operator is freed from the need to move the bale rearward and is able to concentrate on finding the next bale to pick up and maneuver the bale loading trailer apparatus to the required position to do so. Thus operator fatigue and the risk of error and the resulting lost time and possible damage to equipment is reduced.

BRIEF DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE INVENTION

Figure 1:
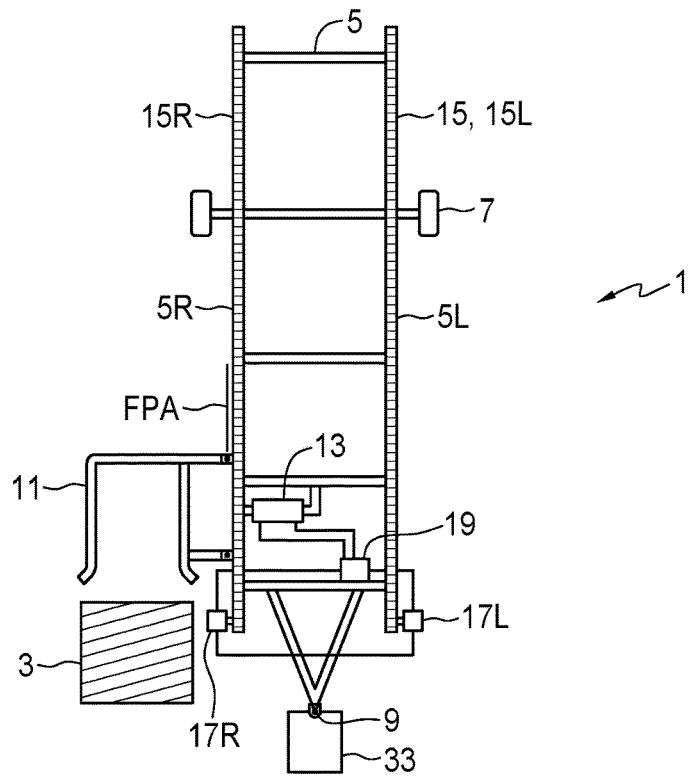
FIG. 1 is a schematic top view of an embodiment of the bale loading trailer apparatus of the present disclosure for loading cylindrical bales that has right and left conveyor chains mounted on corresponding right and left rails of the bale supporting frame, and showing the fork assembly in the lowered position.
Figure 2:
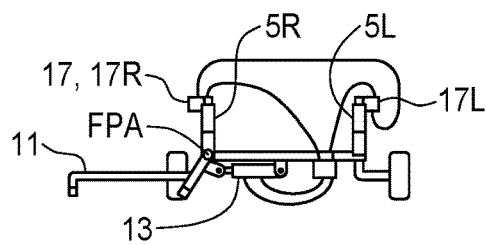
FIG. 2 is a schematic front view of the embodiment of FIG. 1 showing the fork assembly in the lowered position.
Figure 3:
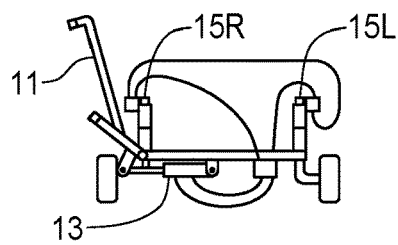
FIG. 3 is a schematic front view of the embodiment of FIG. 1 showing the fork assembly in the raised position.

FIGS. 1-3 schematically illustrate an embodiment of a bale loading trailer apparatus 1 of the present disclosure for loading cylindrical bales 3. The apparatus 1 comprises a bale supporting frame 5 mounted on wheels 7, with a hitch 9 at a front end thereof adapted for connection to a towing vehicle, typically a tractor.

Figures 8A, 8B, 8C, 8D:
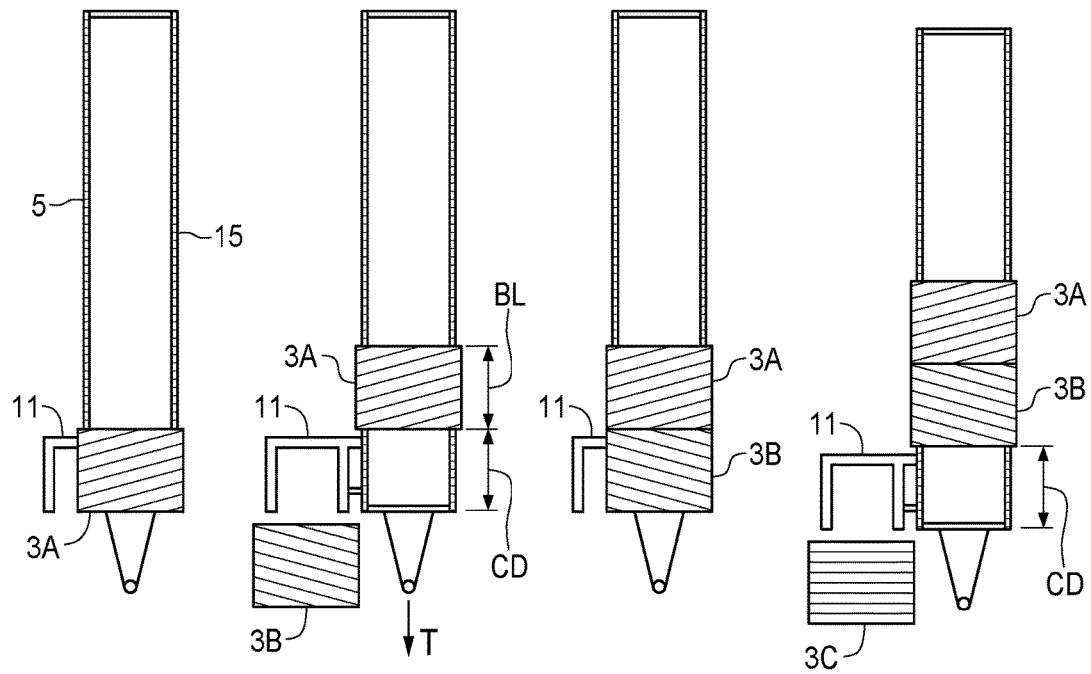
FIGS. 8A-8D show the operation of the apparatus of FIG. 1 loading a plurality of bales.

A fork assembly 11 is pivotally mounted about fork pivot axis FPA beside a front end of the bale supporting frame 5 and is configured to engage a bale 3 resting on a ground surface when in a lowered position illustrated in FIGS. 1 and 2, and to disengage the bale 3 when the fork assembly 11 is in a raised position shown in FIGS. 3 and 8A such that the bale 3 rolls down and moves onto the front end of the bale supporting frame 5. A hydraulic cylinder 13 is operative to move the fork assembly 11 between the lowered position and the raised position.

A conveyor chain assembly 15 extends along the length of the bale supporting frame 5 and is configured such that loaded bales 3 rest on the conveyor chain assembly 15, and move along the bale supporting frame 5 in concert with the conveyor chain assembly 15, and a hydraulic motor drive 17 is operative to move the conveyor chain assembly 15.

FIGS. 8A-8D schematically illustrate the operation of the apparatus 1 picking bales 3 from the ground and moving same onto the bale supporting frame 5. In a typical baling operation the bales 3 have substantially the same bale length BL.

FIG. 8A shows the fork assembly 11 in the raised position having just deposited a first bale 3A on the bale supporting frame 5 such that same rests on the conveyor chain assembly 15. FIG. 8B shows that the fork assembly 11 has moved down from the raised position of FIG. 8A to the lowered position, and the first bale 3A has moved rearward by a cycle distance CD which equal to the bale length BL. In FIG. 8B the apparatus 1 is moving in operating travel direction T and the fork assembly 11 is approaching a second bale 3B. FIG. 8C shows the fork assembly 11 has engaged the second bale 3B and moved to the raised position and the second bale 3B has rolled off the fork assembly 11 onto the bale supporting frame 5, just in front of the first bale 3A. FIG. 8D shows that the fork assembly 11 has again moved down from the raised position of FIG. 8C to the lowered position, and the first and second bales 3A, 3B have moved rearward by the cycle distance CD, leaving room for the next bale 3C.

The rearward movement of the bales 3 is accomplished automatically when the fork assembly moves from the raised position to the lowered position by providing a hydraulic valve circuit 19, schematically illustrated in FIG. 4, that connects the hydraulic cylinder 13 and the hydraulic motor drive 17 such that as the hydraulic cylinder 13 moves the fork assembly 11 from the raised position to the lowered position, hydraulic fluid flows from the hydraulic cylinder 13 through the hydraulic motor drive 17 and causes the conveyor chain assembly 15, and any bales 3 resting thereon, to move a cycle distance CD in a rearward direction, and such that as the fork assembly 11 moves from the lowered position to the raised position, the conveyor chain assembly 15 remains substantially stationary.

In the illustrated apparatus 1 the bale supporting frame 5 comprises right and left rails 5R, 5L, and the conveyor chain assembly 15 comprises corresponding right and left conveyor chains 15R, 15L extending along top sides of the corresponding right and left rails 5R, 5L. The hydraulic motor drive 17 comprises right and left hydraulic motors 17R, 17L operative to move the corresponding right and left conveyor chains 15R, 15L, and the loaded bales 3 rest on the right and left conveyor chains 15R, 15L.

Figure 4A:
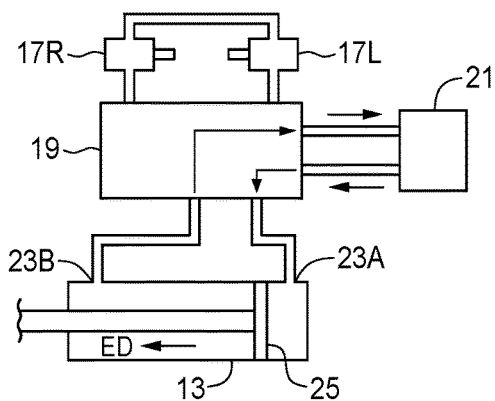
FIGS. 4A and 4B schematically illustrate the flow of hydraulic fluid as the fork assembly moves from the raised position to the lowered position and the conveyor chain assembly moves rearward driven by the hydraulic motors.

In the illustrated apparatus the hydraulic cylinder 13 and fork assembly 11 are configured such that as the pressurized hydraulic fluid source 21 directs pressurized hydraulic fluid into a first port 23A of the hydraulic cylinder 13, as schematically illustrated in FIG. 4A, the piston 25 moves in extending direction ED and the hydraulic cylinder 13 extends to move the fork assembly 11 from the lowered position to the raised position as seen in FIGS. 2 and 3. The hydraulic fluid forced from the second port 23B is directed through the hydraulic valve circuit 19 directly back to the hydraulic fluid source 21, bypassing the hydraulic motor drive 17 such that the hydraulic motors 17R, 17L remain stationary while the fork assembly moves up from the lowered position to the raised position.

Figure 4B:
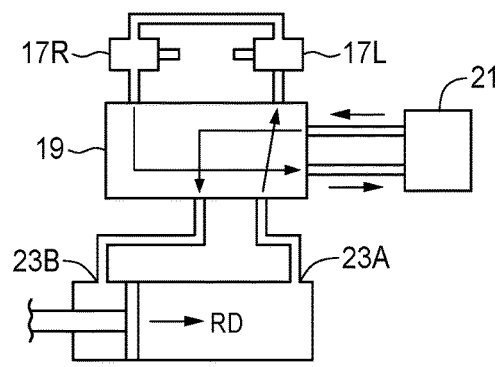

The pressurized hydraulic fluid source 21 directs pressurized hydraulic fluid into a second port 23B of the hydraulic cylinder 13 which then moves the piston 25 in retracting direction RD to move the fork assembly 11 from the raised position to the lowered position. The hydraulic fluid source 21, hydraulic cylinder 13, and hydraulic motors 17R, 17L are schematically illustrated in FIGS. 4A and 4B connected by the hydraulic valve circuit 19.

As the hydraulic fluid source 21 directs hydraulic fluid into the second port 23B the hydraulic cylinder 13 retracts and the fork assembly 11 moves from the raised position to the lowered position. The piston 25 moves in retracting direction RD forcing hydraulic fluid to flow from the first port 23A of the hydraulic cylinder 13. The hydraulic valve circuit 19 is configured to direct flow out of the first port 23A into one of the right and left hydraulic motors, here illustrated as left hydraulic motor 17L, and then from that hydraulic motor 17L into the other hydraulic motor 17R and then back to the hydraulic fluid source 21, as schematically illustrated in FIG. 4B. Thus hydraulic motors 17R, 17L rotate at the same speed and the same amount moving the conveyor chains 15R, 15L evenly rearward, and the hydraulic motor drive 17 drives the conveyor chain assembly 15 as the fork assembly 11 moves from the raised position to the lowered position and the bales 3 move rearward by the cycle distance CD.

In the apparatus 1 the hydraulic cylinder 13 retracts to move the fork assembly from the raised position to the lowered position. It is well known in the art to configure such a linkage such that the hydraulic cylinder extends when lowering the fork assembly from the raised position to the lowered position. In such a configuration the first and second ports 23A, 23B would simply be on opposite ends of the hydraulic cylinder.

Figure 5:
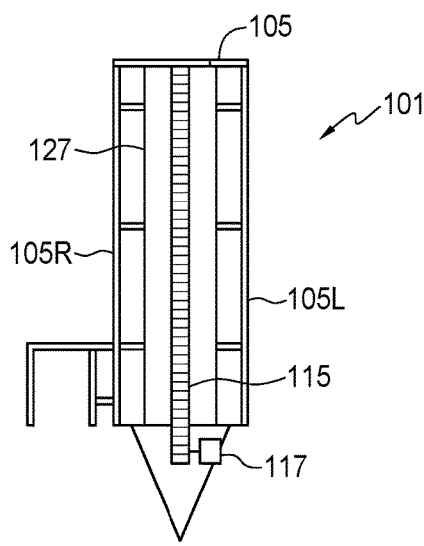
FIG. 5 is a top view of an alternate embodiment of the bale loading trailer apparatus of the present disclosure for loading cylindrical bales that has a single conveyor chain mounted in the middle of a load bed substantially equidistant between right and left frame bars.
Figure 6:
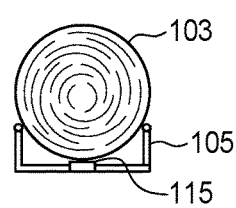
FIG. 6 is a schematic front view of the embodiment FIG. 5 with a bale resting on the conveyor chain.

FIGS. 5 and 6 schematically illustrated an alternate embodiment of a bale loading trailer apparatus 101 of the present disclosure for loading cylindrical bales 103. Here the bale supporting frame 105 comprises right and left frame bars 105R, 105L and the conveyor chain assembly comprises a single conveyor chain 115 extending along a load bed 127 below and substantially midway between the right and left bars 105R, 105L. The hydraulic motor drive here comprises a single hydraulic motor 117. The right and left frame bars 105R, 105L are configured to maintain the loaded bales 3 resting on the conveyor chain 115. The hydraulic valve circuit is the same as that shown in FIGS. 4A, 4B but with only a single hydraulic motor 17.

Figure 7:
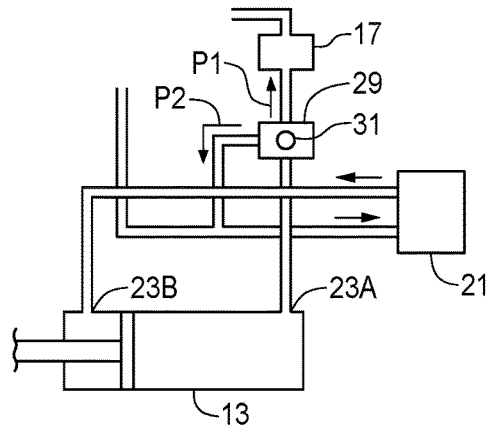
FIG. 7 is a schematic diagram of the flow of hydraulic fluid through a flow control that is operative to adjust the cycle distance to correspond to a bale length.

FIG. 7 schematic illustrates a flow control 29 operative to adjust the cycle distance CD to correspond to a variety of bale lengths BL up to a maximum bale length. The cycle distance CD is proportional to the amount of rotation of the hydraulic motor drive, and the amount of rotation of the hydraulic motor drive 17 is dependent on the amount of hydraulic fluid flowing from the first port 23A of the hydraulic cylinder to the hydraulic motor drive 17. As the fork assembly moves from the raised position to the lowered position pressurized hydraulic fluid from the hydraulic fluid source 21 is directed into the second port 23B of the hydraulic cylinder 13 and a hydraulic fluid flow is discharged from the first port 23A of the hydraulic cylinder 13. The flow control 29 is operative to direct a selected portion P1 of the hydraulic fluid flow to the hydraulic motor drive 17 and a remaining portion P2 of the hydraulic fluid flow back to the hydraulic fluid source 21. A knob 31 on the flow control 29 allows the operator to adjust the selected portion P1 of hydraulic fluid flow to achieve the desired cycle distance to suit a particular bale length.

The maximum bale length that can be achieved will depend on the amount of hydraulic fluid available in the hydraulic cylinder 13 that will be pushed through the hydraulic motor drive, and the amount of rotation of the hydraulic motors 17 for a given amount of hydraulic fluid flow will depend on the size of the hydraulic motor drive. Thus the diameter and a stroke of the hydraulic cylinder 13, and the size of the hydraulic motor drive 17, are selected such that a volume of the hydraulic fluid flow is sufficient to provide a cycle distance that is at least equal to the maximum bale length desired.

Figure 9:
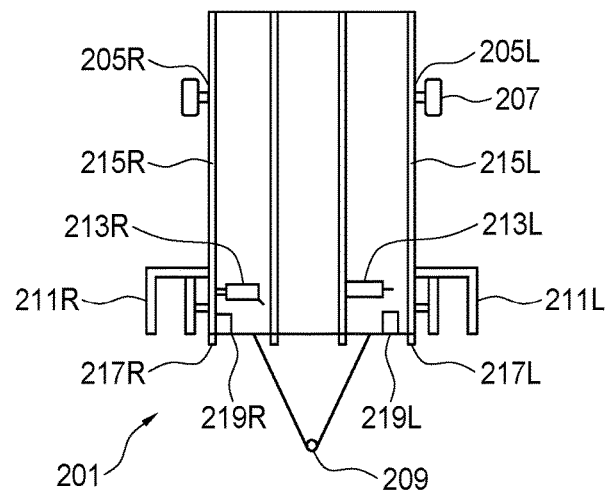
FIG. 9 is a top view of an alternate embodiment of the bale loading trailer apparatus of the present disclosure for loading cylindrical bales that includes side-by-side bale supporting frames for loading side-by-side rows of bales on the apparatus.

FIG. 9 schematically illustrates an alternate embodiment of a bale loading trailer apparatus 201 of the present disclosure for loading cylindrical bales. The apparatus 201 is essentially two of the apparatuses 1 mounted side-by-side on a frame with a hitch at the front end thereof for attaching to a towing vehicle. Right and left bale supporting frames 205R, 205L are mounted on wheels 207. Conveyor chain assemblies 215R, 215L are mounted on the rails of the corresponding bale supporting frames 205R, 205L, and right and left fork assemblies 211R, 211L are mounted adjacent to front ends of the corresponding bale supporting frames 205R, 205L, and right and left hydraulic cylinders 213R, 213L and hydraulic motor drives 217R, 217L are connected by corresponding right and left hydraulic valve circuits 219R, 219L.

The present disclosure also provides a method of loading cylindrical bales 3. The method comprises mounting a bale supporting frame 5 on wheels 7, and connecting a hitch 9 at a front end thereof to a towing vehicle 33; pivotally mounting a fork assembly 11 beside a front end of the bale supporting frame 5 and configuring a hydraulic cylinder 13 to move the fork assembly 11 between a lowered position and a raised position; maneuvering the towing vehicle 33 with the fork assembly 11 in the lowered position such that the fork assembly 11 engages a first bale 3A resting on a ground surface; operating the hydraulic cylinder 13 to move the fork assembly 11 to the raised position where the fork assembly 11 disengages the first bale 3A and the first bale 3A moves onto the front end of the bale supporting frame 5 and rests on a conveyor chain assembly 15 extending along substantially a length of the bale supporting frame 5; wherein the hydraulic cylinder 13 is connected to a hydraulic motor drive 17 operative to move the conveyor chain assembly 15, the connection configured such that as the fork assembly 11 moves from the raised position to the lowered position, hydraulic fluid flows from the hydraulic cylinder 13 through the hydraulic motor drive 17, and such that as the fork assembly 11 moves from the lowered position to the raised position, the conveyor chain assembly 15 remains substantially stationary; moving the fork assembly 5 from the raised position to the lowered position such that hydraulic fluid flows from the hydraulic cylinder 13 through the hydraulic motor drive 17 and causes the conveyor chain assembly 15, and any bales 3 resting thereon, to move a cycle distance CD in a rearward direction; maneuvering the towing vehicle 33 with the fork assembly 11 in the lowered position to engage the fork assembly 11 with a second bale 3B resting on a ground surface; and operating the hydraulic cylinder 13 to move the fork assembly 11 to the raised position such that the second bale 3A moves onto the front end of the bale supporting frame 5 and rests on the conveyor chain assembly 15 forward of the first bale 3A.

The bale loading trailer apparatus 1 of the present disclosure reduces demands on the operator by providing a simple and economical configuration for automatically moving a freshly loaded bale rearwards by rotating the hydraulic motor 17 driving the chain assembly 15 as the fork assembly 11 is lowered after placing a bale on the bale supporting frame 5. Hydraulic fluid flowing from the hydraulic cylinder 13 that operates the fork assembly 11 is directed through the hydraulic motor or motors 17 as the fork assembly 11 is lowered to a position ready to pick up the next bale. The amount of hydraulic fluid flowing through the hydraulic motor or motors 17 is selected to move the bale rearward the desired distance corresponding to the length of the bale.

Thus the operator is freed from the need to move the bale rearward and is able to concentrate on finding the next bale to pick up and maneuver the bale loading trailer apparatus 1 to the required position to do so. Thus operator fatigue and the risk of error and the resulting lost time and possible damage to equipment is reduced.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

The invention claimed is:

1. A bale loading trailer apparatus for loading cylindrical bales, the apparatus comprising:
    a bale supporting frame mounted on wheels, with a hitch at a front end thereof adapted for connection to a towing vehicle;
    a fork assembly pivotally mounted beside a front end of the bale supporting frame and configured to engage a bale resting on a ground surface when in a lowered position, and to disengage the bale when the fork assembly is in a raised position such that the bale moves onto the front end of the bale supporting frame;
    a hydraulic cylinder operative to move the fork assembly between the lowered position and the raised position;
    a conveyor chain assembly extending along substantially a length of the bale supporting frame, and configured such that loaded bales rest on the conveyor chain assembly, and move along the bale supporting frame in concert with the conveyor chain assembly;
    a hydraulic motor drive operative to move the conveyor chain assembly;
    a hydraulic valve circuit connecting the hydraulic cylinder and the hydraulic motor drive to a hydraulic fluid source, wherein the hydraulic fluid source is operative to direct pressurized hydraulic fluid into the hydraulic valve circuit in either a lowering direction or an opposite raising direction;
    wherein the hydraulic fluid source is operative to direct pressurized hydraulic fluid into the hydraulic valve circuit in the lowering direction to move the fork assembly from the raised position to the lowered position and the hydraulic valve circuit is configured such that as the fork assembly moves from the raised position to the lowered position, hydraulic fluid flows from the hydraulic cylinder through the hydraulic motor drive and causes the conveyor chain assembly to move a cycle distance in a rearward direction, and the hydraulic fluid source is operative to direct pressurized hydraulic fluid into the hydraulic valve circuit in the raising direction to move the fork assembly from the lowered position to the raised position and the hydraulic valve circuit is configured such that as the fork assembly moves from the lowered position to the raised position, hydraulic fluid flows from the hydraulic cylinder back to the hydraulic fluid source bypassing the hydraulic motor drive and the conveyor chain assembly remains substantially stationary.

2. The apparatus of claim 1 wherein the bale supporting frame comprises right and left frame bars and the conveyor chain assembly extends along a load bed below and substantially midway between the right and left bars, and wherein the right and left bars are configured to maintain the loaded bales resting on the conveyor chain.

3. The apparatus of claim 2 wherein as the fork assembly moves from the raised position to the lowered position, hydraulic fluid flows from a first port of the hydraulic cylinder into a hydraulic motor of the hydraulic motor drive to rotate the hydraulic motor and the conveyor chain assembly.

4. The apparatus of claim 3 wherein pressurized hydraulic fluid from the hydraulic fluid source is directed into a second port of the hydraulic cylinder to force hydraulic fluid from the first port, and hydraulic fluid from the hydraulic motor is directed back to the hydraulic fluid source as the fork assembly moves from the raised position to the lowered position.

5. The apparatus of claim 4 wherein, as the fork assembly moves from the lowered position to the raised position, hydraulic fluid flows from the hydraulic fluid source into the first port and from the second port back to the hydraulic fluid source and bypasses the hydraulic motor drive.

6. The apparatus of claim 1 wherein the bale supporting frame comprises right and left rails, and the conveyor chain assembly comprises right and left conveyor chains extending along top sides of the corresponding right and left rails, and wherein the hydraulic motor drive comprises right and left hydraulic motors operative to move the corresponding right and left conveyor chains, and wherein the loaded bales rest on the right and left conveyor chains.

7. The apparatus of claim 6 wherein as the fork assembly moves from the raised position to the lowered position, hydraulic fluid flows from a first port of the hydraulic cylinder into one of the right and left hydraulic motors and then into the other of the right and left hydraulic motors to rotate the right and left hydraulic motors at the same speed and the same amount.

8. The apparatus of claim 7 wherein pressurized hydraulic fluid from the hydraulic fluid source is directed into a second port of the hydraulic cylinder to force hydraulic fluid from the first port, and hydraulic fluid from the other of the right and left hydraulic motors is directed back to the hydraulic fluid source as the fork assembly moves from the raised position to the lowered position.

9. The apparatus of claim 8 wherein, as the fork assembly moves from the lowered position to the raised position, hydraulic fluid flows from the hydraulic fluid source into the first port and from the second port back to the hydraulic fluid source and bypasses the hydraulic motor drive.

10. The apparatus of claim 1 wherein the bales have substantially the same bale length, and the cycle distance is substantially equal to the bale length.

11. The apparatus of claim 10 further comprising a flow control operative to adjust the cycle distance to correspond to a variety of bale lengths up to a maximum bale length.

12. The apparatus of claim 11 wherein as the fork assembly moves from the raised position to the lowered position pressurized hydraulic fluid from the hydraulic fluid source is directed into a second port of the hydraulic cylinder and a hydraulic fluid flow is discharged from a first port of the hydraulic cylinder and the flow control is operative to direct a selected portion of the hydraulic fluid flow to the hydraulic motor drive and a remaining portion of the hydraulic fluid flow to the hydraulic fluid source.

13. The apparatus of claim 12 wherein a diameter and a stroke of the hydraulic cylinder, and a size of the hydraulic motor drive, are selected such that a volume of the hydraulic fluid flow is sufficient to provide a cycle distance that is at least equal to the maximum bale length.

14. A method of loading cylindrical bales, the method comprising:
    mounting a bale supporting frame on wheels, and connecting a hitch at a front end thereof to a towing vehicle;

mounting a conveyor chain assembly on the bale supporting frame such that the conveyor chain assembly extends along substantially a length of the bale supporting frame;

connecting a hydraulic motor drive to the conveyor chain assembly such that the hydraulic motor drive is operative to move the conveyor chain assembly;

pivotally mounting a fork assembly beside a front end of the bale supporting frame and configuring a hydraulic cylinder to move the fork assembly between a lowered position and a raised position;

connecting a hydraulic fluid source through a hydraulic valve circuit to the hydraulic cylinder and to the hydraulic motor drive, wherein the hydraulic fluid source is operative to direct pressurized hydraulic fluid into the hydraulic valve circuit in either a lowering direction or an opposite raising direction;

wherein the hydraulic fluid source is operative to direct pressurized hydraulic fluid into the hydraulic valve circuit in the lowering direction to move the fork assembly from the raised position to the lowered position and the hydraulic valve circuit is configured such that as the fork assembly moves from the raised position to the lowered position, hydraulic fluid flows from the hydraulic cylinder through the hydraulic motor drive and causes the conveyor chain assembly to move a cycle distance in a rearward direction; and the hydraulic fluid source is operative to direct pressurized hydraulic fluid into the hydraulic valve circuit in the raising direction to move the fork assembly from the lowered position to the raised position and the hydraulic valve circuit is configured such that as the fork assembly moves from the lowered position to the raised position, hydraulic fluid flows from the hydraulic cylinder back to the hydraulic fluid source bypassing the hydraulic motor drive and the conveyor chain assembly remains substantially stationary;

maneuvering the towing vehicle with the fork assembly in the lowered position such that the fork assembly engages a first bale resting on a ground surface;

directing pressurized hydraulic fluid from the hydraulic fluid source through the hydraulic valve circuit in the raising direction such that the conveyor chain assembly remains substantially stationary and the fork assembly moves to the raised position where the fork assembly disengages the first bale and the first bale moves onto the front end of the bale supporting frame and rests on the conveyor chain assembly;

directing pressurized hydraulic fluid from the hydraulic fluid source through the hydraulic valve circuit in the lowering direction to move the fork assembly from the raised position to the lowered position, and moving the conveyor chain assembly and any bales resting thereon the cycle distance in the rearward direction;

maneuvering the towing vehicle with the fork assembly in the lowered position to engage the fork assembly with a second bale resting on a ground surface; and directing pressurized hydraulic fluid from the hydraulic fluid source through the hydraulic valve circuit in the raising direction to move the fork assembly to the raised position such that the second bale moves onto the front end of the bale supporting frame and rests on the conveyor chain assembly forward of the first bale.

15. The method of claim 14 wherein the bale supporting frame comprises right and left frame bars and the conveyor chain assembly extends along a load bed below and substantially midway between the right and left bars, and wherein the right and left bars are configured to maintain the first and second bales resting on the conveyor chain assembly.

16. The method of claim 15 wherein as the fork assembly moves from the raised position to the lowered position, hydraulic fluid flows from a first port of the hydraulic cylinder into a hydraulic motor of the hydraulic motor drive to rotate the hydraulic motor and the conveyor chain assembly.

17. The method of claim 16 comprising directing pressurized hydraulic fluid from a hydraulic fluid source into a second port of the hydraulic cylinder to force hydraulic fluid from the first port, and directing hydraulic fluid from the hydraulic motor drive back to the hydraulic fluid source as the fork assembly moves from the raised position to the lowered position.

18. The method of claim 17 comprising, as the fork assembly moves from the lowered position to the raised position, directing hydraulic fluid from the hydraulic fluid source into the first port and from the second port back to the hydraulic fluid source, bypassing the hydraulic motor drive.

19. The method of claim 14 further comprising manipulating a flow control to adjust the cycle distance to correspond to a variety of bale lengths up to a maximum bale length.

20. The method of claim 19 wherein as the fork assembly moves from the raised position to the lowered position pressurized hydraulic fluid from the hydraulic fluid source is directed into a second port of the hydraulic cylinder and a hydraulic fluid flow is discharged from a first port of the hydraulic cylinder and the flow control is operative to direct a selected portion of the hydraulic fluid flow to the hydraulic motor drive and a remaining portion of the hydraulic fluid flow to the hydraulic fluid source.

21. The method of claim 20 comprising selecting a diameter and a stroke of the hydraulic cylinder, and a size of the hydraulic motor drive, such that a volume of the hydraulic fluid flow is sufficient to provide a cycle distance that is at least equal to the maximum bale length.

\* \* \* \* \*